(12) United States Patent
Smith

(10) Patent No.: US 6,848,475 B2
(45) Date of Patent: Feb. 1, 2005

(54) ELECTRO-HYDRAULIC VALVE AND SYSTEM

(75) Inventor: David P. Smith, Joliet, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 10/300,318

(22) Filed: Nov. 20, 2002

(65) Prior Publication Data

US 2004/0094218 A1 May 20, 2004

(51) Int. Cl.[7] .................. F15B 13/044; F16K 31/124
(52) U.S. Cl. ...................... 137/625.65; 251/30.02; 251/129.16; 251/129.18
(58) Field of Search .................. 251/30.02, 129.16, 251/129.18; 137/625.65

(56) References Cited

U.S. PATENT DOCUMENTS 5,000,420 A * 3/1991 Hendrixon et al. .... 137/625.65
5,051,631 A * 9/1991 Anderson ............ 137/625.65

* cited by examiner

Primary Examiner—Gerald A. Michalsky
(74) Attorney, Agent, or Firm—J. W. Burrows; D James Barnes; Finnegan, Henderson, Farabow, Garrett & Dunner (57) ABSTRACT

An electro-hydraulic valve is provided for use in a system to control flow and/or pressure within the system. An electro-hydraulic valve arrangement includes a housing and a valving mechanism disposed in the housing. The electro-hydraulic valve arrangement has a hold coil assembly connected to the housing adjacent to the valving mechanism. A force control member having a clapper face is positioned adjacent to the hold coil assembly and the clapper face thereof is maintained at a predetermined distance from a coil face of the hold coil assembly. A double precision adjustment mechanism is operative associated with the force control member and is operative to precisely control the distance between the coil face and the clapper face.

26 Claims, 5 Drawing Sheets

ELECTRO-HYDRAULIC VALVE AND SYSTEM

TECHNICAL FIELD

This invention relates generally to an electro-hydraulic valve and, more particularly, to an electro-hydraulic valve having an electrical coil with a high output force and finite positioning of the gap between the pull faces of the electrical coil.

BACKGROUND

Various arrangements have been used to control the pressure and/or flow in fluid systems. In many of these previous arrangements, by-pass valves have been used to by-pass fluid from the supply conduit. These types of valves normally require that the valving element move a long distance in order to provide good proportional control. Likewise, in order to get good proportional control these valves have been controlled by pilot fluid lines or by manual input. In the various attempts to control these valves electrically, complicated circuits had to be used thus making the control complex and expensive. In order to control a valve arrangement electrically, it is necessary to provide an electrical coil that has a high force over a long range of travel. If one was available, it would be both large and expensive. Hold coil assemblies have been know and used to hold a valve or lever in a desired location once it has been moved to the desired location. These types of hold coil assemblies have high hold forces but have limited longitudinal movement. It has proven to be quite difficult to set and/or adjust the gap between the coil and the holding plate. It is known that in order to obtain the maximum force from the hold coil, the gap or spacing between the hold coil and the hold plate must be accurately controlled. It is desirable to have a valve arrangement that can be electrically and proportionally controlled over a short distance while maintaining the maximum holding force.

The subject invention is directed to overcoming one or more of the problems as set forth above.

SUMMARY OF THE INVENTION

In one aspect of the present invention, an electro-hydraulic valve arrangement is provided and includes a housing having a valving mechanism disposed therein and a hold coil assembly having a coil face being operatively associated with the valving mechanism. A force control member is positioned adjacent to and at a predetermined distance from the coil face of the hold coil assembly. A double precision adjustment mechanism is operatively associated with the force control member and is operative to precisely control the distance between the coil face and the force control member.

DETAILED DESCRIPTION

Figure 1:
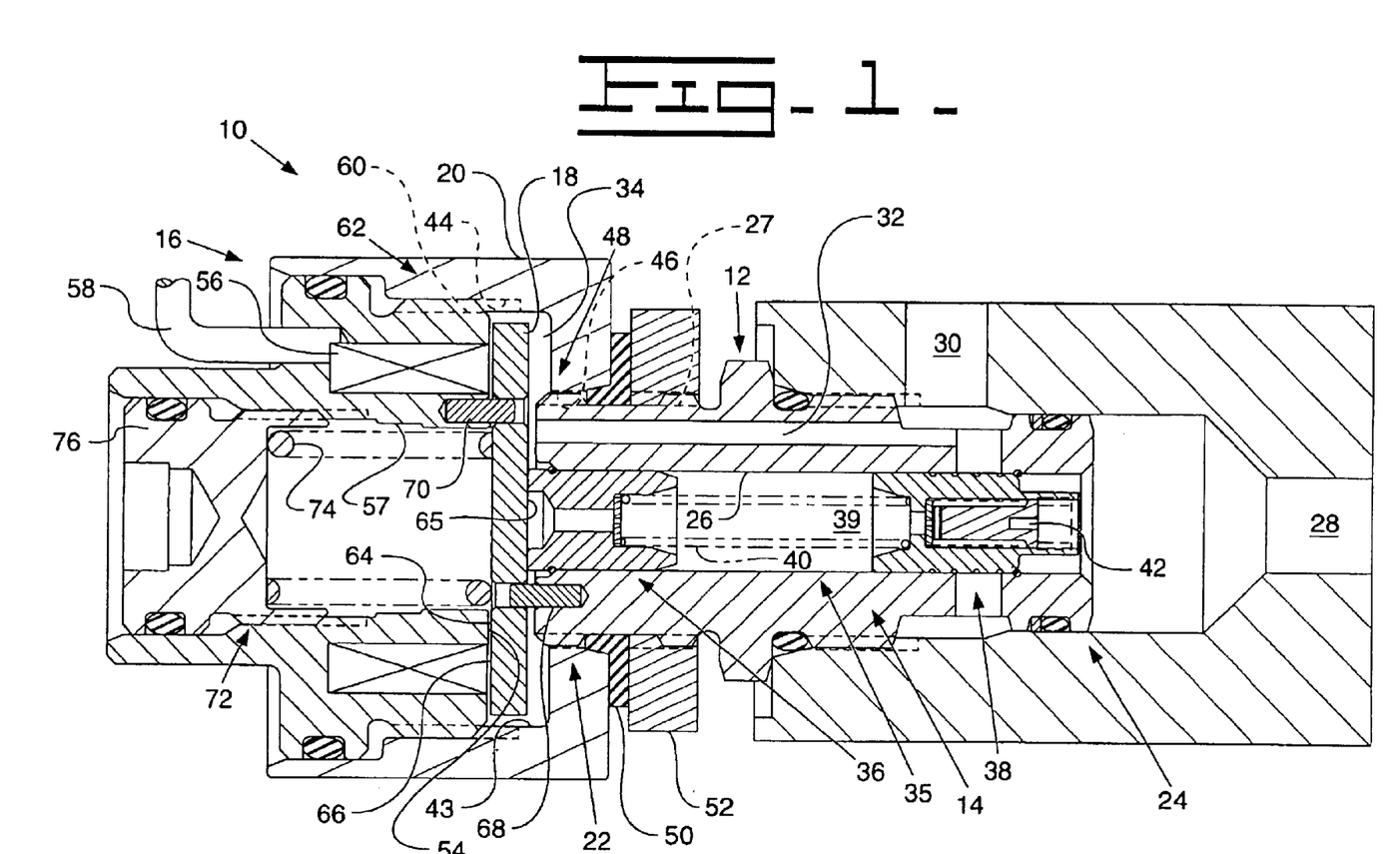
FIG. 1 is a diagrammatic representation of an embodiment of the subject invention.

Referring to FIG. 1 of the drawings, an electro-hydraulic valve arrangement 10 (hereinafter referred to as 'the valve arrangement'), is illustrated. The valve arrangement 10 includes a housing 12 having a valving mechanism 14 disposed therein, a hold coil assembly 16 connected to the housing 12 and operatively associated with the valving mechanism 14, a force control member 18 disposed adjacent to the hold coil assembly 16 and a double precision adjustment mechanism 20 (hereinafter referred to as 'the adjustment mechanism') connected between the hold face coil assembly 16 and the valving mechanism 14.

The housing 12 has first and second end portions 22,24 and has a bore 26 defined therethrough. The first end portion 22 of the housing 12 has an externally disposed left hand thread 27 thereon and the second end portion 24 is connectable to pressurized fluid through an inlet port 28 and connectable to low or zero pressure through an outlet port 30. A passage 32 connects a fluid chamber 34 adjacent to the first end portion 22 to the low pressure outlet port 30.

The valving mechanism 14 includes a valving element 35 and in the subject embodiment, the valving element 35 is a pilot operated pressure relief valve having a pilot stage 36 and a main stage 38. A pilot fluid chamber 39 is defined in the bore 26 between the pilot stage 36 and the main stage 38. A spring 40 is disposed in the pilot fluid chamber 39 between the pilot and main stages 36,38. The main stage 38 is disposed in the second end portion 24 of the housing 12 and, as is well known, the main stage 38 has an orificed passage 42 disposed therein so that the pressurized fluid in the inlet port 28 may controllably pass therethrough to the pilot fluid chamber 39 to the pilot stage 36. Likewise, as is known, the main stage 38 blocks communication of the pressurized fluid in the inlet port 28 from the low pressure at the outlet port 30 when the main stage 38 is in the position shown. The pilot stage 36 is secured in the first end portion 22 of the housing 12 and will be discussed below with respect to the force control member 18.

The adjustment mechanism 20 is a single adjustment member having an opening 43 defined therethrough and includes a right hand thread 44 that is disposed in a portion of the opening 43 and a left hand thread 46 that is disposed in another portion of the opening 43. The number of threads per inch of the left hand thread 46 is greater than that of the right hand thread 44. The left hand thread 46 of the adjustment mechanism 20 is mateable with the left hand thread 27 of the housing 12 to form a first threaded connection 48. A seal 50 and locking nut 52 are disposed about the housing 12 adjacent to the adjustment mechanism 20 and operative to seal the fluid chamber 34 and lock the adjustment mechanism 20 in a desired position relative to the housing 12.

The hold coil assembly 16 has a coil face 54, an electrical winding 56 disposed therein, an opening 57 defined therethrough and an electrical line 58 leading therefrom. A right hand thread 60 is disposed about the hold coil assembly 16 and is mateable with the right hand thread 44 of the adjustment mechanism 20 to for in a second threaded connection 62. The hold coil assembly 16 is sealingly disposed in the opening 43 defined in the adjustment mechanism 20 to seal the fluid chamber 34.

The force control member 18 is disposed between the first end portion 22 of the housing 12 and the coil face 54 of the hold coil assembly 16 and has a clapper face 64 disposed thereon adjacent to the coil face 54. In the subject embodiment, the force control member 18 is a flat plate. One side thereof is the clapper face 64 and the other side thereof forms a flat valving face 65 that is adjacent to the first end portion 22 of the housing 12. A thin, non-metallic shim 66 is disposed between the clapper face 64 and the coil face 54 to ensure that the respective faces do not contact one another. The clapper face 64 is precisely positioned by the adjustment mechanism 20 at a predetermined distance from the coil face 54. The force control member 18 is axially movable, as viewed in the drawings, between the first end portion 22 of the housing 12 and the hold coil assembly 16 but is prohibited from rotation relative to the housing 12 and/or the hold coil assembly 16. Likewise, the hold coil assembly 16 is prohibited from rotation relative to the housing 12. This is true because a first pin 68 is secured to the first end portion 22 of the housing 12 and slideably disposed in the force control member 18 while a second pin 70 is secured to the hold coil assembly 16 and slideably disposed in the force control member 18. However, the hold coil assembly 16 is movable in an axial direction through the second threaded connection 62.

A biasing mechanism 72 is disposed in the opening 57 of the hold coil assembly 16. The biasing mechanism 72 includes a spring member 74 disposed between the force control member 18 and a sealed, adjustable plug 76 that is threaded into the opening 57 thereof.

The spring member 74 urges the force control member 18 in a direction towards the first end portion 22 of the housing 12 into contact with the pilot stage 36 of the valving mechanism 14. Simultaneously, the spring 40 within the fluid control chamber 39 urges the main stage 38 of the valving mechanism 14 towards a flow blocking position to block communication of the pressurized fluid at the inlet port 28 with the low pressure at the outlet port 30 thereof. As is known, once the pressure within the fluid control chamber 39 reaches an effective force equivalent to the force of the spring 74, the force control member 18 separates from the pilot stage 36 to vent fluid from the fluid control chamber 39 to the low pressure port 30 through the fluid chamber 34 and the passage 32.

Figure 2:
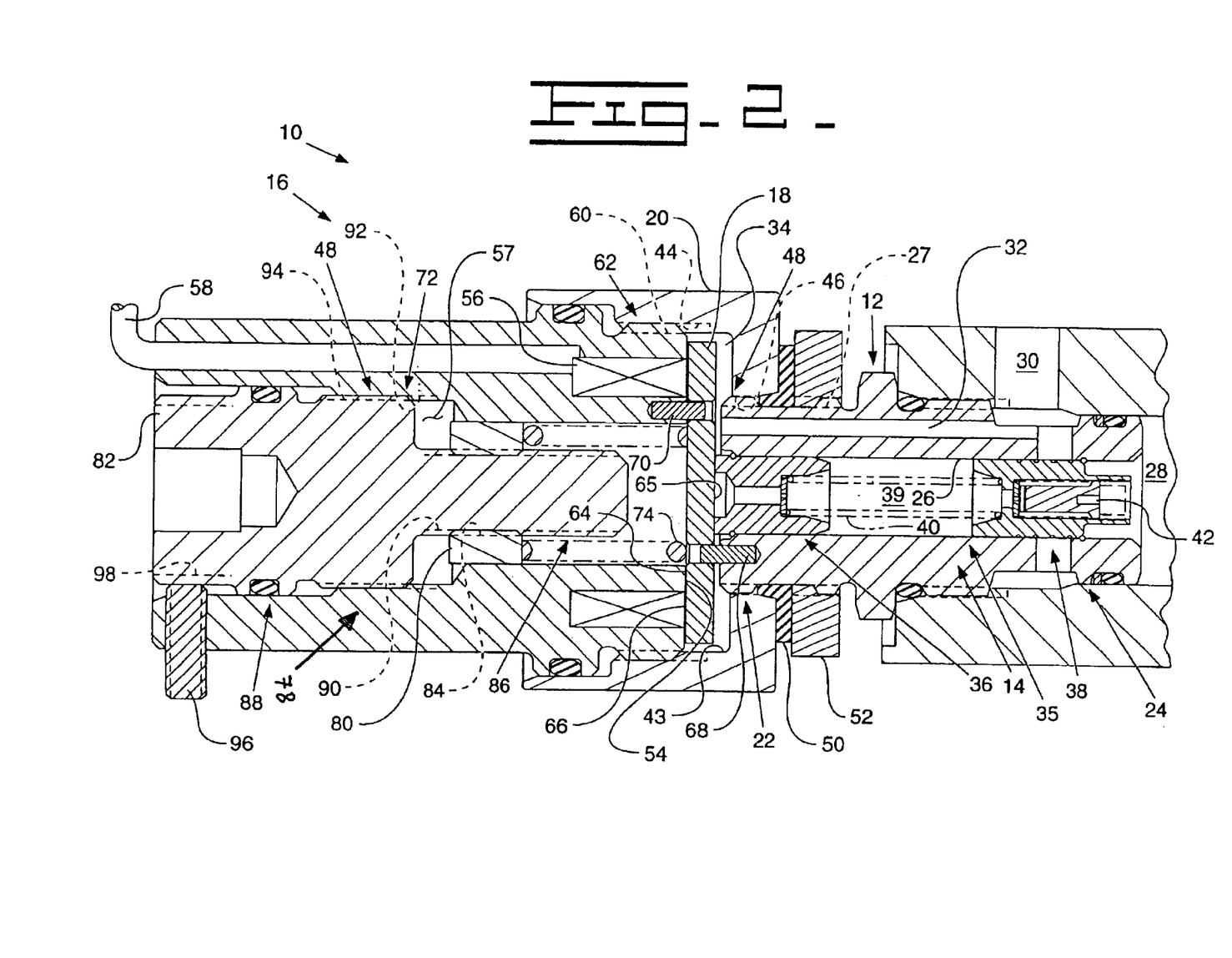
FIG. 2 is a diagrammatic representation of a modified embodiment of the subject invention of FIG. 1.

Referring to FIG. 2, a modified embodiment of FIG. 1 is illustrated. Like elements have like element numbers. FIG. 2 is the same as FIG. 1 except the biasing mechanism 72 of FIG. 2 is different. The biasing mechanism of FIG. 2 includes the spring 74 and a double precision force adjustment mechanism 78 (hereafter referred to as 'the force adjustment mechanism'). The force adjustment mechanism 78 includes a force member 80 and an adjustment member 82. The force member 80 is slideably disposed in the opening 57 of the hold coil assembly 16 adjacent the spring 74 and has a left hand thread 84 disposed therethrough.

The adjustment member 82 has first and second end portions 86,88. A left hand thread 90 is disposed on the first end portion 86 thereof and is mateable with the left hand thread 84 of the force member 80. A second right hand thread 92 is disposed on the hold coil assembly 16 and located within the opening 57 thereof. A right hand thread 94 is disposed on the adjustment member 82 and is mateable with the second right hand thread 92. The second end portion 88 of the adjustment member 82 is sealingly disposed in the opening 57 of the hold coil assembly 16.

A spring detent mechanism 96 is located on the hold coil assembly 16 and the detent portion of the spring detent mechanism 96 opens into the opening 57 thereof. The second end portion 88 of the adjustment member 82 has a plurality of grooves 98 defined thereon that are in operative engagement with the detent of the spring detent mechanism 96. It is recognized that the plurality of grooves 98 could be in the form of serrations.

Figure 3:
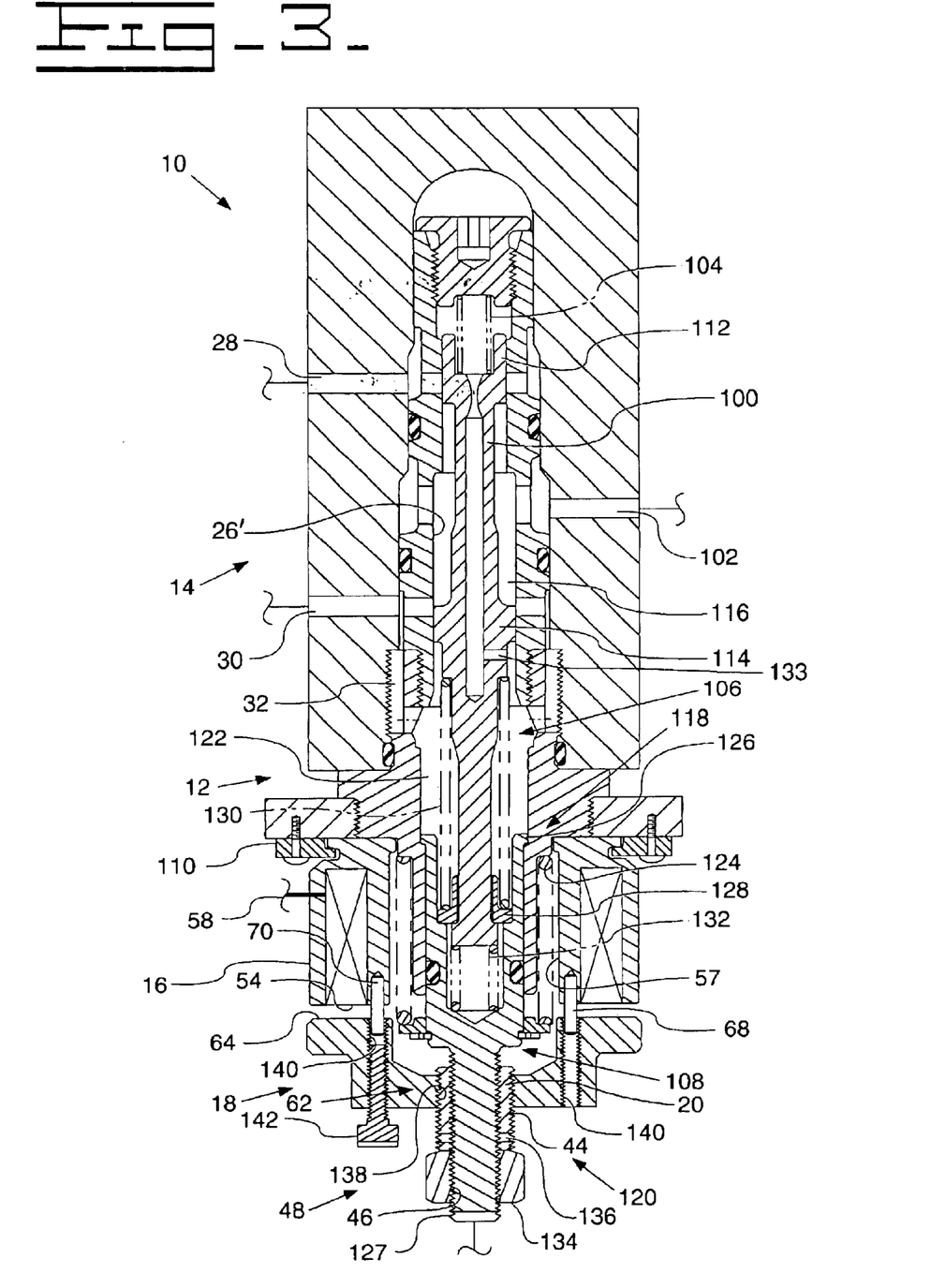
FIG. 3 is a diagrammatic representation of another embodiment of the subject invention.

Referring to FIG. 3, another embodiment of the subject invention is illustrated. Like elements from FIG. 1 have like element numbers. The valving mechanism 14 of FIG. 3 is in the form of a pilot control valve. It is recognized that more than one pilot control valve could be used in a fluid system at one time. For example, a joy stick pilot control valve could use up to four or more to control at least two different functions.

The valving element 35 of the valving mechanism 14 of FIG. 3 is a spool valve 100 operable to control the flow of pressurized fluid at the inlet port 28 between a control port 102 and the low pressure port 30. The spool valve 100 is movable from a first position at which the inlet port 28 is blocked from the control port 102 and the control port 102 is open to the outlet port 30 towards a second position at which the inlet port 28 is open to the control port 102 and the low pressure outlet port 30 is blocked from the control port 102. A light force spring member 104 biases the spool valve 100 towards its first position. A biasing arrangement 106 is disposed on the spool valve 100 at the end thereof opposite to the light force spring member 104. The biasing arrangement 106 is operatively loaded through an actuating plunger 108 to urge the spool valve 100 towards its second position in cooperation with a force generated by an electrical signal being delivered to the hold coil assembly 16 through the electrical line 58. The hold coil assembly 16 of FIG. 3 is secured to the housing 12 by a clamping mechanism 110.

The spool valve 100 is slideably disposed in the bore 26 of the housing 12 and in the subject embodiment, the bore 26 is a stepped bore and the spool valve 100 has first and second lands 112,114. The first land 112 is disposed on the spool valve 100 at the end thereof adjacent the light force spring member 104 and is smaller in diameter than that of the second land 114. A fluid chamber 116 is defined in the bore 26 between the first and second lands 112,114 and the differential area on the spool valve 100 is located in the fluid chamber 116. Any pressurized fluid in the fluid chamber 116 acts on the differential area thus urging the spool valve 100 towards its first position. The fluid chamber 116 is in open communication with the control port 102.

The actuating plunger 108 has first and second end portions 118,120. The first end portion 118 of the actuating plunger 108 is sealingly disposed in a fluid chamber 122 defined in the housing 12 between the actuating plunger 108 and the spool valve 100. A light force spring 124 urges the actuating plunger 108 towards its first position as viewed in the drawing of FIG. 3 and a travel limiting leg 126 prevents further movement thereof relative to the housing 12. At least a portion of the second end portion 120 extends out beyond the hold coil assembly 16 and has a left hand thread 127 disposed thereon. The second end portion 120 of the actuating plunger 108 is connectable to a remote mechanical input member. Likewise, the hold coil assembly 16 is externally located for ease of maintenance.

The biasing arrangement 106 has a movable spring retainer 128 that is slideably disposed on the valve spool 100 and operative to move against the bias of a first spring member 130 disposed between the movable spring retainer 128 and the spool valve 100. The movable spring retainer 128 is in contact with the second end portion 120 of the actuating plunger 108. At the first position of the spool valve 100, the light force spring 104 holds the spool valve 100 against the second end portion 120 of the actuating plunger 108 and the first spring member 130 of the biasing arrangement 106 is effectively in an unloaded condition. The biasing arrangement 106 includes a second spring member 132 that is disposed between the actuating plunger 108 and the spool valve 100. At the first position of the actuating plunger 108, the second spring member 132 is also effectively in an unloaded condition. The passage 32 connects the fluid chamber 122 to the low pressure port 30 and a restrictive passageway 133 connects opposite ends of the spool valve 100 with one another to provide a damping action therebetween in a conventional manner.

The adjustment mechanism 20 of FIG. 3 is also a single adjustment member having the left hand thread 46 disposed therein and being mateable with the left hand thread 127 of the actuating plunger 108 to define the first threaded connection 48. The right hand thread 44 thereof is disposed on the outer portion of the adjustment mechanism 20. A lock nut 134 is operative to lock the position of the adjustment mechanism 20 relative to the second end portion 120 of the actuating plunger 108 in a conventional manner. Slots 136 are provided on the adjustment mechanism 20 to provide a cavity for a tool (not shown) to rotate the adjustment mechanism 20, when desired, relative to the actuating plunger 108.

The force control member 18 of the embodiment of FIG. 3 is externally located and has the clapper face 64 disposed thereon adjacent to the coil face 54 of the hold coil assembly 16 and maintained therefrom at a predetermined distance. A right hand thread 138 is disposed through the force control member 18 and mateable with the right hand thread 44 of the adjustment mechanism 20 to form the second threaded connection 62. A plurality of holes 140 are defined in the force control member 18 parallel with the right hand thread 138 thereof and at least one hole of the plurality of holes 140 is threaded. At least one threaded adjustable stop member 142 is disposed in the at least one threaded hole 140.

The first and second pins 68,70 are secured in the hold coil assembly 16 and extend outward from the coil face 64. Each of the first and second pins 68,70 are disposed in respective ones of the plurality of holes 140 and operative to permit axial movement of the force control member relative to the coil face 54 but prohibit relative rotation of the force control member 18 relative to the hold coil assembly 16.

Figure 4:
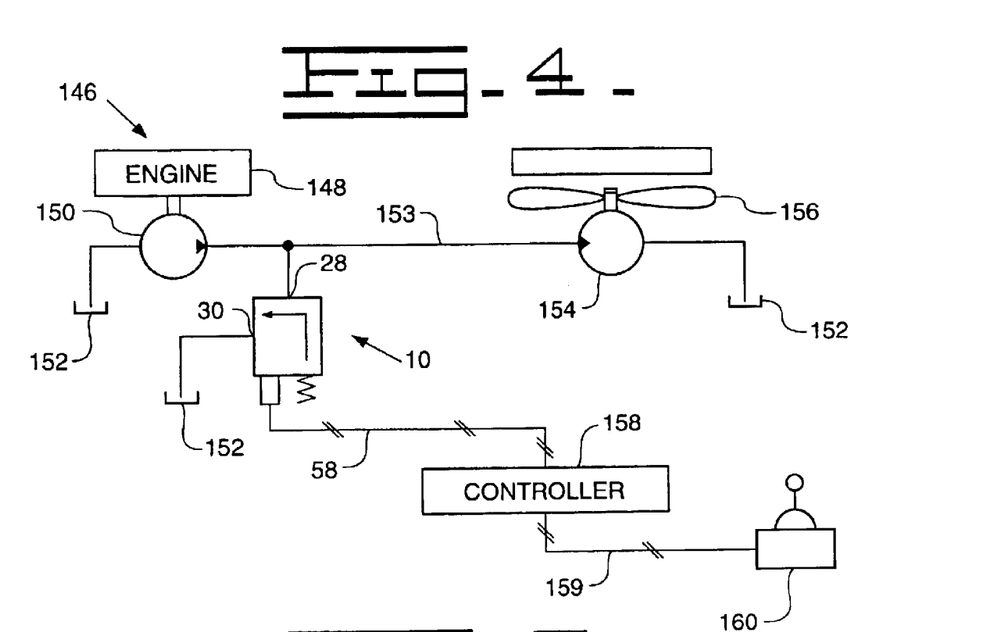
FIG. 4 is a part diagrammatic and a part schematic representation of a fluid system utilizing the subject invention.

Referring to FIG. 4 of the drawings, a fluid system 146 is illustrated and includes a source of power, such as an engine 148, drivingly connected to a source of pressurized fluid, such as a pump 150 which receives fluid from a low pressure source, such as a reservoir 152. The fluid system 146 is a fan drive system wherein the pump 150 delivers pressurized fluid through a supply conduit 153 to a fluid motor 154 which turns a cooling fan 156. The inlet port 28 of the valve arrangement 10 is connected to the supply conduit 153 and the outlet port 30 thereof is connected to the reservoir 152. The electrical line 58 of the valve arrangement 10 is connected to a controller 158 which in turn is connected through an electrical line 159 to a command input arrangement 160. The valve arrangement 10 is operative in the subject fluid system 146 to control the flow/pressure in the supply conduit 153 in order to control the speed of the fan 156.

Figure 5:
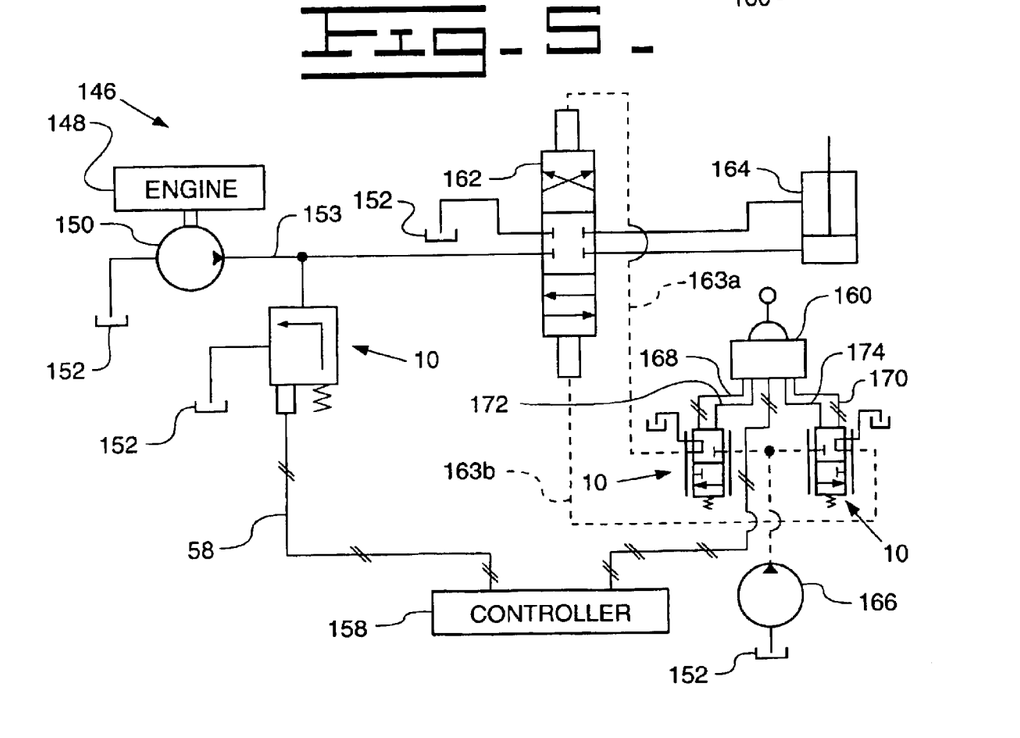
FIG. 5 is a part diagrammatic and a part schematic representation of another fluid system utilizing the subject invention.

Referring to FIG. 5 of the drawings, another fluid system 146 is illustrated. Like elements have like element numbers. The fluid system 146 of FIG. 5 includes the engine 148, the pump 150, the reservoir 152 and the supply conduit 153 like that of FIG. 4. A pilot operated directional control valve 162 (hereafter referred to as 'the directional valve') is connected to the supply conduit 153 and the reservoir 152 and is operative to control a fluid actuator 164 in a well known manner. A first valve arrangement 10, like that of FIG. 1 or 2 is connected to the supply conduit 153 like that of FIG. 4 and is controlled by the controller 158 in response to various system parameters and/or the command input arrangement 160.

The fluid system of FIG. 5 also includes two valve arrangements 10 like that of FIG. 3. Each of the two valve arrangements 10 is operative to control pressurized fluid from a source of pressurized fluid, such as a pilot pump 166, to respective ends of the directional valve 162 through respective pilot conduits 163a,163b in response to receipt of an electrical signal through respective electrical lines 168, 170 being delivered to the electrical line 58 of the respective two valve arrangements 10. The command input arrangement 160 of the subject embodiment may be a joystick control or a single lever controller and is operative to generate an electrical signal in proportion to the degree of manual input. The generated electrical signal is delivered to controller 158 and to both of the two valve arrangements 10. Additionally, manual input connections 172,174 provide a direct manual input to the actuating plunger 108 of each of the two valve arrangements 10 in the event there is an electrical failure in the fluid system 146. It is recognized that the mechanical outputs from the command input arrangement 160 could be in physical contact with the actuating plunger 108 of the respective ones of the two valve arrangements 10.

Figure 6:
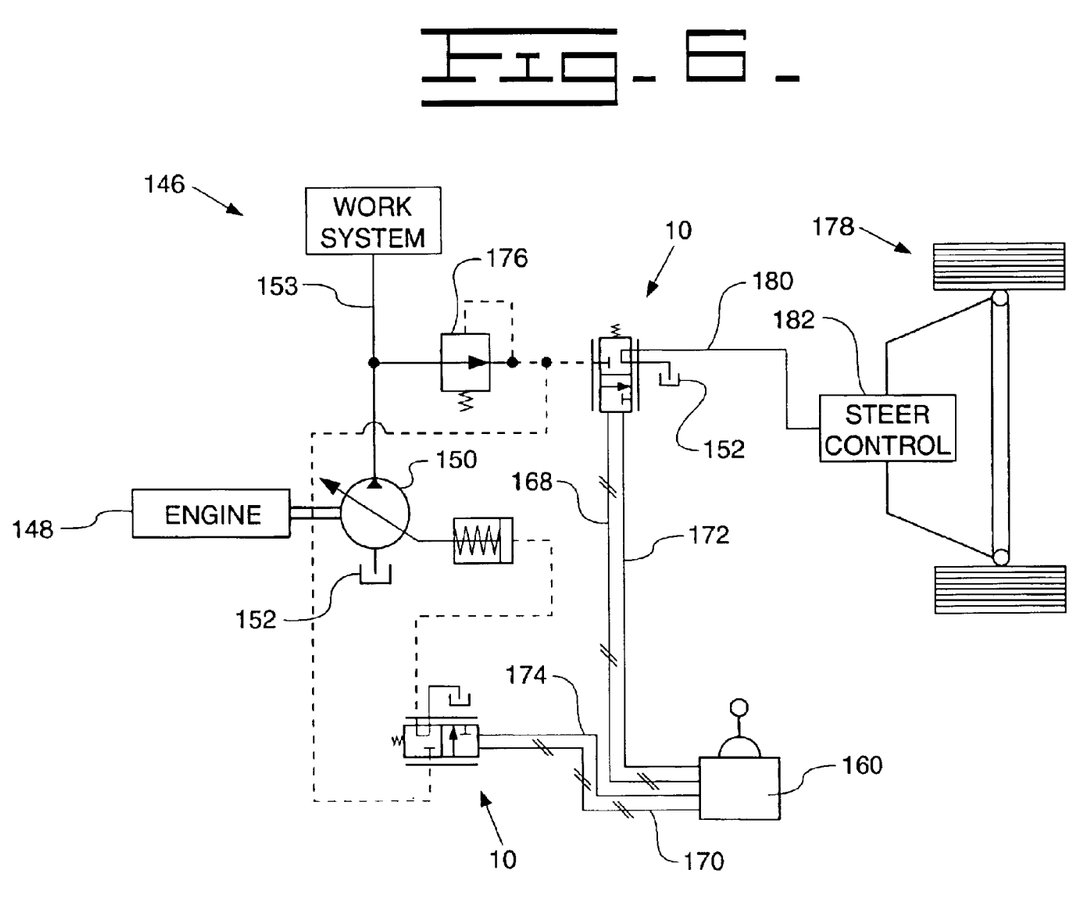
FIG. 6 is a part diagrammatic and a part schematic representation of yet another fluid system utilizing the subject invention.

Referring to FIG. 6 of the drawings, still another fluid system 146 is illustrated. Like elements have like element numbers. In the fluid system 146 of FIG. 6, the pump 150 is a variable displacement fluid pump and the pressurized control fluid being directed thereto is controlled by one of the valve arrangements 10. In the subject embodiment, the valve arrangement 10 being used is like that of FIG. 3 but it is recognized that if a mechanical over-ride is not needed, either of the embodiments of FIGS. 1 and 2 would be workable. The work system of FIG. 6 could be like the directional valve 162 and fluid actuator 164 of FIG. 5 or various others. As is illustrated in the embodiment of FIG. 6, a pressure reducing valve 176 is connected to the supply conduit 153 and operative to produce a source of pressurized pilot fluid downstream thereof.

Another valve arrangement 10, like that of FIG. 3 is connected to the pressurized pilot fluid from pilot pump 166 (see. e.g. FIG. 5) and is used to control the steering of machine steer wheels 178 or the like. The control port 102 of the valve arrangement 10 of FIG. 3 is connected through a conduit 180 to a steer control mechanism 182.

The command input arrangement 160 is operable to generate an electrical signal that is delivered to the electrical line 58 of the respective valve arrangements 10 through the respective electrical lines 168,170. Likewise, in the event of an electrical failure, the command input arrangement 160 can deliver respective mechanical inputs through the mechanical connections 172,174. It is recognized that the command input arrangement 160 of the subject embodiment may have two separate levers as opposed to being a joy stick controller.

In each of the fluid systems 146 of FIGS. 4–6, each of the valve arrangements 10 is used to proportionally control the pressure of the fluid at the inlet port 28 between first and second pressure levels or to control the volume of fluid in the supply conduit 153. Likewise, each of the valve arrangements may be used to control the pressure/flow of the fluid at the control port 102. It is also recognized that depending on system parameters and requirements, the various valve arrangements 10 set forth in each of the fluid systems 146 could be interchanged without departing from the essence of the subject invention. It is envisioned that the subject invention would cover various other fluid systems that could be derived by one skilled in the art.

INDUSTRIAL APPLICABILITY

In the operation of the valve arrangement 10, as set forth in FIG. 1, the valving mechanism 14 serves as, for example, a pilot operated relief valve, wherein the pressure of the pressurized fluid at the inlet port 28 is controlled between a minimum and a maximum pressure level. The main stage 38 of the valving mechanism 14 acts to block the flow of pressurized fluid from the inlet port 28 to the low pressure port 30 in a conventional manner. Likewise, in a conventional manner, pressurized fluid in the inlet port 28 is directed across the orificed passage 42 into the pilot fluid chamber 39 and acts in cooperation with the spring 40 to hold the main stage 38 in the flow blocking position. The pressurized fluid in the pilot fluid chamber 39 acts on the flat valving face 65 of the force control member 18 through the pilot stage 36 urging the force control member 18 away from the pilot stage 36. The force control member 18 is being held against the pilot stage 36 by the force of the spring 74. The force of the spring 74 provides the maximum pressure permitted at the inlet port 28 of the housing 12. Once the effective force of the pressurized fluid in the pilot fluid chamber 39 exceeds the force of the spring 74, the force control member 18 separates from the pilot stage 36 thus permitting pressurized fluid in the pilot control chamber 39 to be vented to the fluid chamber 34 and through the passage 32 to the low pressure port 30. As the pressurized fluid in the pilot control chamber 39 is being vented, the vented fluid is being replenished by pressurized fluid from the inlet port 28 that is being directed across the orificed passage 42. A pressure drop is created between the inlet port 28 and the pilot control chamber 39 by flow across orificed passage 42. Once the pressure drop across the orificed passage 42 exceeds the force of the spring 40, the main stage 38 moves towards an open position to relieve pressurized fluid from the inlet port 28 to the low pressure port 30. Once the over pressure condition within the inlet port 28 is overcome, the pilot stage 36 closes and the maximum pressure level is again maintained.

In order to control the level of the maximum pressure at the inlet port 28 to a lower pressure level, an electrical signal is directed to the hold coil assembly 16 through the electrical line 58. The change in pressure level is controlled in proportion to the magnitude of the electrical signal. In the subject embodiment, the electrical signal is increased to lower the pressure level, but it is recognized that the maximum pressure level may be initially at its minimum level with a large electrical signal being delivered to the hold coil assembly 16 and the pressure level at the inlet port 28 would increase to its maximum level in proportion to a decreasing electrical signal.

In order to achieve the maximum force level between the coil face 54 and the clapper face 64 of the force control member 18, a small distance/gap must be established between the coil face 54 and the clapper face 64. During assembly, the locking nut 52 is screwed onto the left hand thread 27 of the housing 12, the seal 50 is placed against the locking nut 52 and then the adjustment mechanism 20 is screwed onto the left hand thread 27. The locking nut 52 is not tightened against the adjustment mechanism 20 until the gap has been precisely set.

The second pin 70 is secured to the hold coil assembly 16 and the clapper face 64 of the force control member 18 is located adjacent the coil face 54 with the thin shim 66 disposed therebetween and the second pin 70 extends into an opening of the force control member 18. The first pin 68 along with the spring 74 and the sealed adjustable plug 76 are not installed at this time. The hold coil assembly 16 is screwed into the right hand thread 44 of the adjustment member 20 until the force control member 18 nears the pilot stage 36 of the valving mechanism 14. The force control member 18 is moved into contact with the pilot stage 36 to ensure that a desired small gap is defined between the coil face 54 and the clapper face 64. After aligning another opening in the force control member 18 with an opening in the housing 12, the first pin 68 is inserted through the another opening and secured in the housing 12 with a portion of the first pin 68 extending into the another opening in the force control member 18.

The spring 74 and the sealed adjustable plug 76 are installed and the adjustable plug 76 is tightened to a point at which the force of the spring 74 acting on the force control member 18 is sufficient to establish the maximum pressure level at the inlet port 28. To precisely establish the distance or gap between the coil face 54 and the clapper face 64 in order to achieve the best force capabilities thereof, pressurized fluid at a known level is directed to the inlet port 28 and then an electrical signal of a known magnitude is directed to the hold coil assembly 16 through the electrical line 58. The electrical signal of a known magnitude should provide a force on the force control member 18 that would subtract a force, by a known amount, from the force of the spring 74. Consequently, the level of the pressure in the inlet port 28 should be lowered to a known amount. If the pressure level in the inlet port 28 is not at the expected level, the distance or gap between the coil face 54 and the clapper face 64 needs fine adjustment. By holding the hold coil assembly 16 so that it cannot rotate and then rotating the adjustment mechanism 20 the gap is changed. Clockwise rotation of the adjustment mechanism 20, as viewed in FIG. 1, results in the size of the gap getting smaller and counter-clockwise rotation results in the size of the gap getting bigger. As the size of the gap is changed, the pressure level at the inlet port 28 also changes. Once the desired pressure level at the inlet port 28 is achieved, the locking nut 52 is tightened to ensure that the adjustment mechanism 20 is maintained in its adjusted location. It may be necessary to allow for any changes induced by the tightening of the locking nut 52. Likewise, changes in the size of the gap may also have an effect on the pressure level at the inlet port 28 since the force on the spring 74 has been altered. It may be necessary to make minor adjustments to the force on the spring 74 then readjust the gap accordingly. The gap in the drawing of FIG. 1 has been made larger than actual size for illustrative purposes.

Axial movement of the adjustment mechanism 20 on the housing 12 is due to the first threaded connection 48 and axial movement of the hold coil assembly 16 relative to the adjustment mechanism 20 is due to the second threaded connection 62. Since the first threaded connection 48 is a left hand thread and the second threaded connection 62 is a right hand thread, the degree of movement of the coil face 54 relative to the clapper face 64 is the difference in axial movement of the hold coil assembly 16 and the adjustment mechanism 20. In the subject embodiment, the number of threads per inch of the first threaded connection 48 is larger than the number of threads per inch of the second threaded connection 62. Consequently, as the difference in the number of threads per inch of the first and second threaded connections 48,62 becomes smaller, the smaller the change in the size of the gap per each revolution of the adjustment mechanism 20. As one skilled in the art can recognize, there is no practical, economical way to produce a single threaded connection that would have the number of threads per inch that would produce such a small axial adjustment per thread revolution.

Referring to the operation of FIG. 2, the only difference in operation is the adjustment of the force on the spring 74 that establishes the maximum pressure at the inlet port 28. The force on the spring 74 of FIG. 2 is finely adjusted by the force adjustment mechanism 78. By using the force adjustment mechanism 78, the force on the spring 74 may be precisely adjusted. By holding the hold coil assembly 16 so that it cannot rotate and then rotating the adjustment member 82, the force on the spring 74 is increased/decreased by finite amounts. By rotating the adjustment member 82 in the clockwise direction, as viewed in FIG. 2, the force on the spring 74 is increased a finite amount. This is accomplished by the fact that the threaded connection between the threads 92 of the hold coil assembly 16 and the threads 94 of the adjustment member 82 is a right hand thread and the threaded connection between the threads 84 of the force member 80 and the threads 90 of the adjustment member 82 is a left hand thread. Consequently, as discussed above with respect to the adjustment mechanism 20, the degree of movement of the force member 80 against the spring 74 is the difference between the number of threads per inch of the respective threaded connections.

The interaction between the spring detent mechanism 96 disposed on the hold coil assembly and the plurality of grooves 98 defined on the second end portion 88 of the adjustment member 82 provides the opportunity to adjust the force on the spring 74 more precisely by counting the number of 'clicks' as the adjustment member 82 is being rotated. Each 'click' would, depending on the direction of rotation, equate to a certain change in the force on the spring 74.

Referring to the operation of the embodiment of FIG. 3, the valving mechanism 14 of the valve arrangement 10 would serve, for example, as a pilot control valve. In the valve arrangement 10 of FIG. 3, the source of pressurized fluid is available at the inlet port 28 and the spool valve 100 functions as the valving element 35 to control the level of pressure in the control port 102 relative to the low pressure port 30. Initially, with no electrical signal being delivered to the hold coil assembly 16, the spool valve 100 is held at its first position and against the actuating plunger 108 by the light force spring 104 and the biasing arrangement 106 disposed on the spool valve 100 is in its unloaded condition. Likewise, the actuating plunger 108 is biased to its first position by the force of the light force spring 124. Since the force control member 18 is secured to the actuating plunger 108 and the hold coil assembly 16 is secured to the housing 12, the predetermined distance/gap is established between the clapper face 64 and the coil face 54.

During assembly, the gap is roughly established by screwing the adjustment mechanism 20 onto the second end portion 120 of the actuating plunger 108 then, prior to installing the first and second pins 68,70, screwing the force control member 18 onto the adjustment mechanism 20 until the desired rough gap is established. Once the desired rough gap is established, holes in the force control member 18 are aligned with corresponding holes in the hold coil assembly 16 and the first and second pins 68,70 are installed therein so that a portion of each pin remains in the holes in the force control member 18.

In order to precisely adjust the size of the gap between the coil face 54 and the clapper face 64, pressurized fluid is directed to the inlet port 28 and an electrical signal of a predetermined magnitude is directed to the hold coil assembly 16. The attraction force of the electrical signal on the force control member 18 moves the force control member 18 along with the actuating plunger 108 in an upward direction, as viewed in FIG. 3, against the bias of the two light force springs 104,124. Since the biasing arrangement 106 is in contact with the actuating plunger 108, the spool valve 100 also moves in an upward direction. Once the spool valve 100 moves to a position at which the low pressure port 30 is blocked from the control port 102 and the inlet port 28 begins to 'crack' or open to the control port 102, the spool valve 100 is held at the cracking position and the biasing arrangement 106 is preloaded as the actuating plunger 108 moves further upward. Once pressurized fluid is open to the control port 102, the pressurized fluid therein acts on the differential area on the spool valve 100 within the fluid chamber 116 creating a force urging the spool valve 100 in the downward direction. Once the actuating plunger 108 generates a preload on the biasing arrangement 106 that, in cooperation with the force of the two light force springs 104,124, is equal to the force generated on the force control member 18 by the predetermined electrical signal, the spool valve 100 is maintained at the cracking position and will 'dither' there with the forces thereon balanced. At this point, most of the gap has been closed but a small portion of the gap remains. The magnitude of the electrical signal to the hold coil assembly 16 is increased to a second desired magnitude which increases the attraction force on the force control member 18. The increased force thereon acts through the actuating plunger 108 to urge the spool valve 100 further to the upward direction. The resulting movement of the spool valve 100 increases the level of pressure in the control port 102. The level of the increased electrical signal should generate a desired level of pressure in the control port 102.

If the level of the pressure in the control port 102 is not at the desired level, the gap between the coil face 54 and the clapper face 64 needs to be finely adjusted. This is accomplished by inserting a tool into the slots 136 in the adjustment mechanism 20 and rotating it in a desired direction to either increase or decrease the size of the gap. The movement of the adjustment mechanism 20 is the same as that described with respect to FIG. 1. Once the size of the gap has been adjusted to achieve the desired control pressure in the control port 102, the lock nut 134 is tightened against the adjustment mechanism 20 to secure it in its adjusted position. Once the gap has been finally adjusted, the threaded adjustable stop member 142 is screwed into one of the holes 140 of the force control member 18. The stop member 142 is screwed to a depth that would provide engagement of the stop member 142 with the first pin 70 so that the coil face 54 cannot come into intimate contact with the clapper face 64.

Since the hold coil assembly 16 is externally located, it is more readily available for service. Likewise, since at least a portion of the actuating plunger 108 is externally accessible, it may be mechanically connected to a manual actuator so that the valve arrangement 10 can still be controlled in the event of an electrical power loss.

Referring to the operation of the fluid system 146 of FIG. 4, the valve arrangement 10 is used to control the speed of the fan 156 by controlling the pressure of the fluid within the supply conduit 153. It is well known that the resistance to fan rotation has to be overcome by increasing the pressure of the fluid that is acting on the fan motor 154. When the fan 156 is operating at a desired speed, the pressure of the fluid in the supply conduit will be at a predetermined level. Consequently, the level of the pressure at the inlet port 28 of the valve arrangement 10 is maintained at the desired pressure level by controllably venting fluid from the supply conduit 153 in response to the electrical signal being delivered by the controller 158. An increase in the magnitude of the electrical signal results in a decrease in the pressure in the inlet port 28 and also in the fluid conduit 153.

Referring to the operation of the fluid system 146 of FIG. 5, the valve arrangement 10 of FIG. 1 is connected to the supply conduit 153 and can be used to control the level of pressure therein or to control the volume of fluid being delivered to the fluid actuator 164. To control the volume of fluid flow in the supply conduit 153, the controller 158 would determine the flow requirements of the system 146, sense the actual flow and direct an electrical signal to the valve arrangement 10 to controllably vent any unneeded fluid from the supply conduit 153.

Additionally in FIG. 5, the pilot operated directional control valve 162 is controlled by two of the valve arrangements 10 illustrated in FIG. 3. In the subject fluid system 146, the command input arrangement 160 is a joy stick controller and generates an electrical signal therefrom, in proportion to the degree of lever movement, to the respective valve arrangements 10. The electrical signal received by the respective valve arrangements 10 acts to produce a corresponding pilot fluid signal from the respective control ports 102 to the associated pilot conduits 163a,163b to move the directional control valve 162 in the desired direction. In the event there is an electrical failure in the fluid system 146, the respective mechanical connections 172,174 act to move the associated actuating plungers 108, thus maintaining control of the directional control valve 162.

Referring to the operation of FIG. 6, the pump 150 of the fluid system 146 is a variable displacement pump that controls a work system and controls the steering of machine steer wheels 178. Since the valve arrangement 10 of FIG. 3 is typically a pilot control valve, a pressure reducing valve 176 is used to lower the control pressure to a lower pressure level. It is recognized that a separate source of pressurized fluid could be used. One valve arrangement 10 is associated with the displacement changing mechanism of the variable displacement pump 150 and acts in response to a signal from the command input arrangement 160 or a controller 158, like that of FIG. 4 or 5, to change the pressure of the fluid at the control port 102 and thus change the displacement of the variable displacement pump 150. The mechanical input 174 acts to directly control the actuating plunger 108 thereof in the event of an electrical failure.

Another valve arrangement 10 is used to control the steering of the machine steer wheels 178 in response to an electrical signal from the steer command input arrangement 160. The pressure of the fluid at the control port 102 of the valve arrangement 10 that is providing fluid to the steer control mechanism 182 is proportional to the magnitude of the electrical signal being delivered to the hold coil assembly 16 of the valve arrangement 10.

From the foregoing embodiments, it is readily apparent that a valve arrangement 10 is provided that utilizes the high force capabilities of a hold coil used in combination with a valving mechanism 14. This is accomplished primarily by having a double precision adjustment mechanism 20 that is effective to precisely set and adjust the gap between the hold coil assembly 16 and the force control member 18.

Other aspects, objects and advantages of the invention can be obtained from a study of the drawings, the disclosure and the appended claims.

What is claimed is:

1. An electro-hydraulic valve arrangement, comprising:
   a housing;
   a valving mechanism disposed in the housing;
   a hold coil assembly having a coil face and being operatively associated with the valving mechanism;
   a force control member having a clapper face, the clapper face being positioned adjacent to and at a predetermined distance from the coil face of the hold coil assembly; and
   a double precision adjustment mechanism operatively associated with the force control member and being operative to precisely control the distance between the coil face of the hold coil assembly and the clapper face of the force control member,
   wherein the double precision adjustment mechanism includes first and second threaded connections, and
   wherein the first threaded connection is a left hand threaded connection and the second threaded connection is a right hand threaded connection.

2. The electro-hydraulic valve arrangement of claim 1 wherein the number of threads per inch on the first threaded connection is greater than the number of threads per inch on the second threaded connection.

3. The electro-hydraulic valve arrangement of claim 2 wherein the double precision adjustment mechanism is a single adjustment member having both a right hand thread and a left hand thread thereon.

4. The electro-hydraulic valve arrangement of claim 3 in combination with a fluid system wherein the electro-hydraulic valve arrangement is operative to proportionally control the pressure in the fluid system between first and second pressure levels.

5. The electro-hydraulic valve arrangement of claim 4 in combination with a fluid system wherein the electro-hydraulic valve arrangement is operative to proportionally control the volume of fluid in the fluid system.

6. The electro-hydraulic valve arrangement of claim 4 wherein the hold coil assembly has a right hand thread that is mateable with the right hand thread of the single adjustment member to form the second threaded connection.

7. The electro-hydraulic valve arrangement of claim 6 wherein the force control member is a flat plate and the clapper face thereof is one side of the flat plate and is disposed adjacent to the coil face of the hold coil assembly, the other side of the flat plate is disposed adjacent to the valving mechanism located within the housing.

8. The electro-hydraulic valve arrangement of claim 7 wherein the housing of the electro-hydraulic valve arrangement has first and second end portions and the first end portion thereof has a left hand thread disposed thereon that is mateable with the left hand thread of the single adjustment member to form the first threaded connection.

9. The electro-hydraulic valve arrangement of claim 8 wherein the force control member is movable between the hold coil assembly and the first end portion of the housing and is restrained from rotation relative to both the hold coil assembly and the housing.

10. The electro-hydraulic valve arrangement of claim 9 wherein a biasing mechanism biases the force control member towards the valving mechanism disposed in the housing.

11. The electro-hydraulic valve arrangement of claim 10 wherein the second end portion of the housing is connectable to pressurized fluid, the biasing mechanism is adjustable, and the valving mechanism is a pilot operated relief valve having the pilot stage thereof located in the first end portion of the housing in mating contact with the other side of the flat plate of the force control member and the main stage of the pilot operated relief valve is disposed in the housing at the second end portion thereof.

12. The electro-hydraulic valve arrangement of claim 11 wherein the biasing mechanism includes a spring member and a double precision force adjustment mechanism in contact with the spring member and both being disposed within the hold coil assembly.

13. The electro-hydraulic valve arrangement of claim 12 wherein the double precision force adjustment mechanism includes a force member in contact with the spring member and an adjustment member having first and second end portions, the force member has an internal left hand thread mateable with a left hand thread on the first end portion of the adjustment member and the adjustment member has an external right hand thread located generally adjacent the first end portion and the right hand thread is mateable with an internal right hand thread disposed within the hold coil assembly.

14. The electro-hydraulic valve arrangement of claim 13 including a spring detent mechanism disposed in the hold coil assembly and the force member has a plurality of grooves defined on the second end portion thereof and in operative contact with the spring detent mechanism.

15. The electro-hydraulic valve arrangement of claim 3 wherein the hold coil assembly has an opening defined therethrough and is secured to the housing and the valve mechanism includes a valving element, an actuating plunger, and a biasing arrangement disposed between the valving element and the actuating plunger.

16. The electro-hydraulic valve arrangement of claim 15 wherein the actuating plunger has first and second end portions, the first end portion thereof is in contact with the biasing arrangement through the opening of the hold coil assembly and the second end portion extends outward from the opening of the hold coil assembly.

17. The electro-hydraulic valve arrangement of claim 16 wherein the second end portion of the actuating plunger has a left hand thread defined thereon and the left hand thread of the single adjustment member of the double precision adjustment mechanism is mateable with the left hand thread of the second end portion of the actuating plunger to define the first threaded connection.

18. The electro-hydraulic valve arrangement of claim 17 wherein the force control member has a right hand thread therethrough that is mateable with the right hand thread of the single adjustment member of the double precision adjustment mechanism to form the second threaded connection.

19. The electro-hydraulic valve arrangement of claim 18 wherein the hold coil assembly and the force control member are externally located and the clapper face of the force control member is movable towards and away from the coil face of the hold coil assembly and is restrained from rotation relative to the hold coil assembly.

20. The electro-hydraulic valve arrangement of claim 19 including an adjustable stop member disposed in the force control member and operative to prohibit contact of the clapper face and the coil face.

21. The electro-hydraulic valve arrangement of claim 20 wherein the second end portion of the actuating plunger is connectable to a mechanical control lever that permits manual operation of the electro-hydraulic valve arrangement.

22. The electro-hydraulic valve arrangement of claim 21 wherein the electro-hydraulic valve arrangement is a pilot control valve.

23. The electro-hydraulic valve arrangement of claim 21 combination with a fluid system having a manual control level connected to the second end portion of the actuating plunger of the valving mechanism.

24. The electro-hydraulic valve arrangement of claim 23 wherein the fluid system controls the steering of a machine.

25. The electro-hydraulic valve arrangement of claim 3 in combination with a fluid system for controlling the speed of a fan in a fan drive system.

26. The electro-hydraulic valve arrangement of claim 3 in combination with a fluid system having a variable displacement pump and the electro-hydraulic valve arrangement is operative to control the displacement of the variable displacement pump.

* * * * *